United States Patent [19]
O'Konski

[11] 3,904,162
[45] Sept. 9, 1975

[54] CLIP ATTACHABLE TO METAL STUD FOR SUPPORT OF LATERAL BRACING

[75] Inventor: Theodore S. O'Konski, Wheeling, W. Va.

[73] Assignee: Wheeling-Pittsburgh Steel Corporation, Pittsburgh, Pa.

[22] Filed: June 7, 1974

[21] Appl. No.: 477,181

Related U.S. Application Data

[62] Division of Ser. No. 385,457, Aug. 3, 1973, Pat. No. 3,854,192.

[52] U.S. Cl. .............................................. 248/223
[51] Int. Cl.² ................................... F16M 13/00
[58] Field of Search ............ 248/27, 73, 220.5, 223, 248/225, 239; 403/252, 348, 346

[56] References Cited
UNITED STATES PATENTS

| | | | |
|---|---|---|---|
| 1,140,940 | 5/1915 | Bales | 248/223 X |
| 2,474,172 | 6/1949 | Tinnerman | 248/56 X |
| 2,496,928 | 2/1950 | Bing et al | 403/348 X |
| 2,721,334 | 10/1955 | Sanders | 248/225 X |
| 3,278,149 | 10/1966 | Brucker | 248/225 X |

FOREIGN PATENTS OR APPLICATIONS

| | | | |
|---|---|---|---|
| 901,555 | 1/1954 | Germany | 248/73 |
| 56,873 | 9/1944 | Netherlands | 248/73 |

*Primary Examiner*—William H. Schultz
*Attorney, Agent, or Firm*—Buell, Blenko & Ziesenheim

[57] ABSTRACT

The specification discloses a clip attachable manually to steel channel studding, used in building construction, for supporting in a preliminary position a horizontal bracing member that extends through a perforation or slot in the web of the studding. The clip makes possible a novel method for permanently attaching with assurance the bracing member to the studding in a uniformly horizontal position, accomplished by manually adjusting the preliminarily installed clip to a final level corresponding to a horizontal position of the bracing member before welding the clip to the studding and the bracing element to the clip.

4 Claims, 9 Drawing Figures

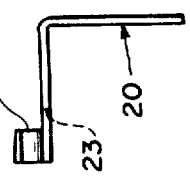
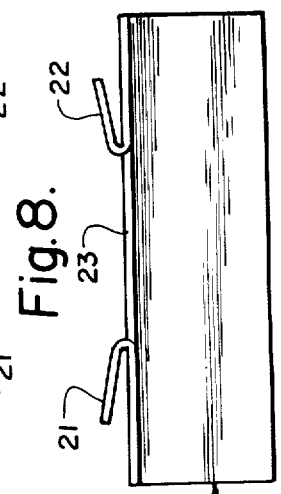
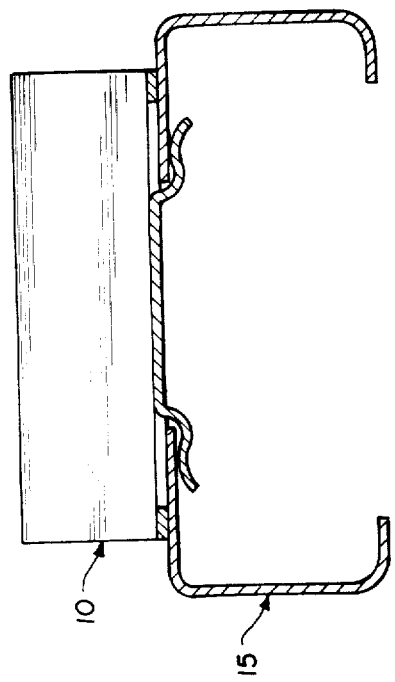
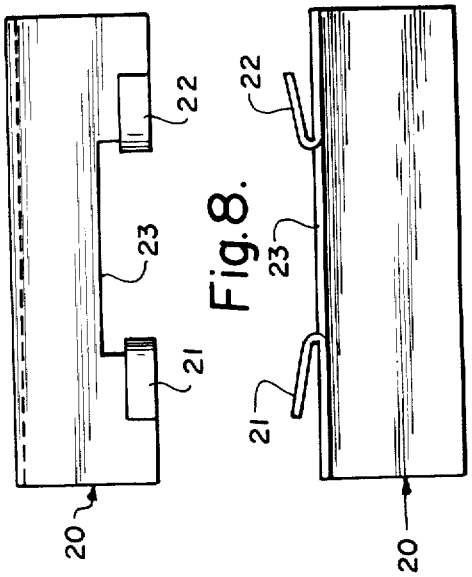
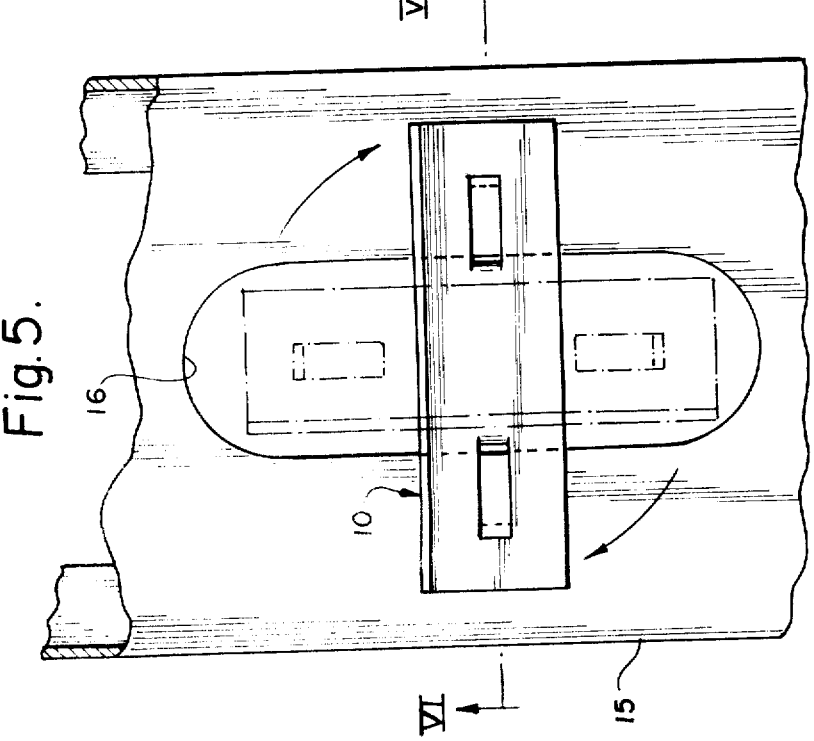

CLIP ATTACHABLE TO METAL STUD FOR SUPPORT OF LATERAL BRACING

This is a division of application Ser. No. 385,457, filed Aug. 3, 1973, now U.S. Pat. No. 3,854,192.

This invention relates to devices attachable to metal studding for supporting and attaching lateral bracing elements to the studding to provide stability and rigidity to a row of studs.

In building construction, it is conventional to provide lateral bracing to vertical studding. This is relatively easy when conventional sized lumber, such as 2 inches × 4 inches, is employed.

More recently, with the increasing trend toward the use of metal studs, the lateral bracing of the studs presents certain difficulties and problems. It has been the practice, in this regard, to provide metal studs with perforations in the form of elongated holes or slots in the web thereof to enable lateral bracing members to extend laterally through a series or row of studs. Customarily, present practice is to first weld an angle bracket to the web of the studding and then after the lateral bracing member is laid on the angle brackets to weld it to the bracket at each stud.

In order to save time and effort, workmen do not precisely locate the level of the angle brackets on successive studs, before welding to the studding. In consequence, by reason of the irregularity in the level of the brackets on successive studs in a row, lateral bracing members laid on the brackets are not uniformly horizontal. Thus the lateral bracing members after being welded to the brackets present an irregular appearance which is objectionable.

In order to avoid the objectionable appearance of the lateral bracing members resulting from present-day practice, I propose to provide a clip which may be readily and easily attached to the metal studding, in the first instance, by even an unskilled workman, without the necessity of welding. Following preliminary installation and horizontal alignment of the lateral bracing members on the clips, the level of the clips may be shifted to appropriate supporting positions, by tapping with a hammer, to insure a uniformly horizontal level of the bracing members, following which welding of the clips to the studs and to the bracing members may be effected.

I provide a clip adaptable for attachment to different sizes of studs of varying gauge metal thickness. Different lengths of the clip are provided according to the width of the studding to which it is applied but the attachment means on the clips is uniform for all lengths of clips and accommodates itself to varying gauge thickness of the studding.

More specifically, I provide a clip made of a plain angle bracket of uniform gauge metal thickness. One of the two legs of the brackets has punched or struck-up out of the level of the leg a pair of aligned, oppositely facing tabs, the spacing between the bights of the tabs being different according to the different widths of slots in the webs for different sizes of studs. Installation of the aforesaid clip is effected by holding it in a vertical position against the web of the studding with the tabs extending through a slot in the web, and then turning the clip to a horizontal position, in which the web of the studding is gripped under the tabs.

I further prefer to provide a clip, of the type heretofore mentioned, wherein the tabs on the clip are yieldably adjustable to accommodate different gauge thickness of metal in the studding to which it is attached.

I provide a method involving utilization of the aforedescribed clip to insure a final uniformly horizontal level of lateral bracing elements by first installing the clip on the studding in a preliminary trial position and then manually adjusting it to a final position as determined by the true horizontal level of the bracing element before welding the clip to the studding and the bracing element to the clip.

A preferred embodiment of my invention is described in detail hereinafter in connection with the accompanying drawings, wherein:

FIG. 5 is an elevational view of a metal stud, showing the manner in which the clip is installed thereon;

FIG. 6 is a sectional view, taken on the line VI—VI of FIG. 5;

FIG. 7 is a plan view of a modified form of clip; and

FIGS. 8 and 9 are side and end views, respectively, of the form of clip shown in FIG. 7.

Figure 2:
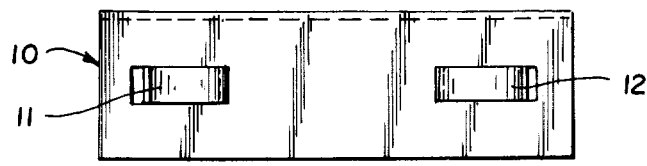
FIG. 2 is a plan view of a preferred form of clip.
Figure 3:
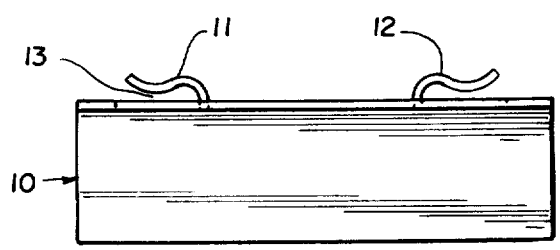
FIGS. 3 and 4 are side and end views, respectively, of the clip shown in FIG. 2.
Figure 4:
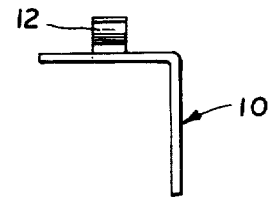

Referring to FIGS. 2, 3 and 4, the preferred form of clip 10 embodying my invention is shown. Essentially, the clip 10 is an angle bracket of suitable gauge thickness of metal, such as No. 16 gauge galvanized steel. The two legs of the clip are disposed at an angle of 90° with respect to each other and are of equal length, preferably, as shown in FIG. 9. On the center line of one of the legs are two oppositely facing tabs 11 and 12 struck-up out of the plane of the leg by severing a rectangular area on three sides. As will be seen in FIG. 3, the tabs 11 and 12 are crimped or curved to provide a clearance space 13 with respect to the surface of the leg. Clearance space 13 is approximately equal to the smallest gauge thickness of the metal studs to which it is to be applied. If applied to a stud having a greater gauge thickness, the tabs yieldingly bend away from the leg to accommodate the greater gauge thickness of the stud.

Referring to FIG. 5, let it be assumed that it is desired to install the clip 10 on a metal stud 15 in which an elongated slot or opening 16 is provided. The workman grasps the non-perforated leg between his thumb and forefinger and then with the clip in a vertical position inserts the leg having the tabs 11 and 12 lengthwise in the opening 16. The clip is then turned, in a clockwise direction, as shown by the arrows in FIG. 5, until the clip is horizontal and the tabs 11 and 12 grip the metal wall of the stud at the sides of the opening 16 in the manner shown in FIG. 6. It will be seen that the distance between the bights of the two tabs is somewhat less than the width of the slot 16 in order to insure the ability of the clips to be turned to the horizontal position.

Figure 1:
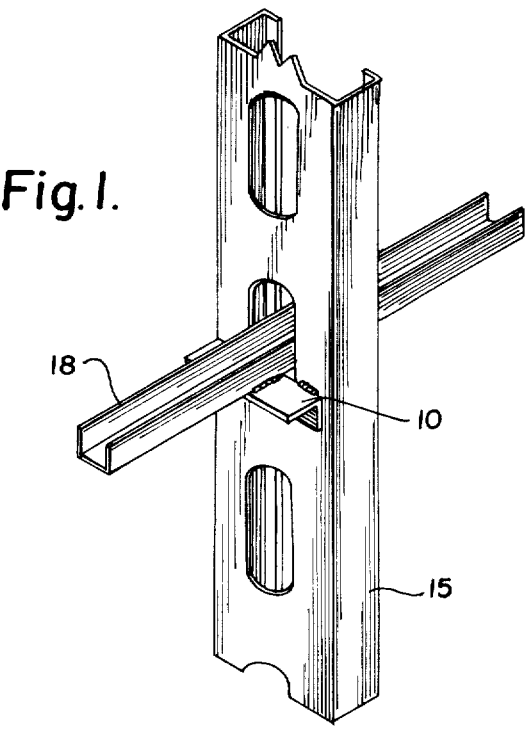
FIG. 1 is a view, illustrating the manner by which my improved clip is adapted to support and attach a lateral bracing member to a metal stud.

With the clip 10 thus affixed to the stud 15, similar clips are then affixed to the adjoining studs in a row with stud 15. One or more lateral bracing members, such as the channel 18 shown in FIG. 1, may then be inserted through the holes in the studs corresponding to slot 16 and rested on the outwardly projecting leg of the clips. Since the clips are held frictionally to the web of the studs, a workman may now tap the clips gently with a hammer to level the bracing members in true horizontal alignment. With the bracing members now so aligned and leveled, the workman may now spot weld the clips to the studs to permanently fix them in position, following which the bracing member may be spot welded, at the various studs, to the clips respectively attached thereto.

It will be seen, therefore, that difficulties incident to alignment and leveling of the lateral bracing members as heretofore practiced are entirely obviated, with a saving of time and expenditure of effort.

Referring to FIGS. 7–9, an alternate form of clip 20 is shown. The clip 20 differs from the clip 10 in the location and contour of the tabs 21 and 22 corresponding to tabs 11 and 12. As seen in FIG. 7, the tabs 21 and 22 are struck-up out of the area of the one leg immediately adjoining the outer edge, while a recess or cut-out area 23 between the tabs is provided. Moreover, the tabs are straight and bent back at a slight angle to the leg of the clip. In this form of clip the angle of inclination of the tabs is such as to provide clearance for studding having maximum gauge thickness of metal. To insure a snug fit for studding of lesser gauge thickness of metal, the tabs must be tapped with a hammer to decrease the angle of inclination of the tabs.

In a manner similar to that of the tabs on clip 10, the spacing between the tabs 21 and 22 may be varied correspondingly to suit different widths of slots in the studs. Moreover, the clips 20 may be made up in different lengths so as to be shorter than the width of the studs on which they are used.

The clip 20 is applied to the studs in the same manner previously described for clip 10, except for tapping of the tabs 21 and 22 to fit the gauge thickness of metal in the stud.

While specific embodiments of a clip suited for the purpose have been described herein, it will be apparent that modifications may be made therein within the terms of the following claims:

I claim:

1. A clip for attachment to metal studding to provide support for a lateral bracing element extending through a slot in the stud, said clip comprising a metal angle bracket having two legs disposed at a right-angle to each other, one of said legs having two oppositely extending tabs struck-up out of the level of the leg, said tabs being on a line parallel to the other leg and having their bight portions spaced apart symmetrically with respect to a line midway of the ends of the leg, said tabs being placed under tension, when the clip is installed on the studding by turning from a vertical to a horizontal position, by the web of the studding at opposite sides of a slot in the studding entering between said tabs and the leg out of which they are struck, said clip being maintained in position on the studding by the gripping action of the tabs on the web of the studding.

2. A clip according to claim 1, wherein the tabs comprise a curved bight portion and an end portion positioned by said bight portion to provide a clearance space with the leg out of which they are struck corresponding to the minimum gauge thickness of metal studding to which the clip is to be applied, the bight portion being yieldably tensioned to accommodate greater gauge thickness of other metal studding.

3. A clip according to claim 1, wherein said tabs are on a line coinciding substantially with the center line of said one leg.

4. A clip according to claim 1, wherein the said oppositely extending tabs are located at the extremity of the leg out of which they are struck, and are inclined away from the leg to provide a clearance space with the leg sufficient to accommodate metal studding of a maximum gauge thickness, said tabs being bendable inwardly to provide smaller clearance space appropriate for metal studding of lesser gauge thickness.

* * * * *